United States Patent
Aschenbrenner et al.

(10) Patent No.: US 12,031,512 B2
(45) Date of Patent: Jul. 9, 2024

(54) IGNITION APPARATUS HAVING A PRE-CHAMBER WHICH IS COUPLED ROTATABLY WITHOUT OFFSET TO AN IGNITION SOURCE, INTERNAL COMBUSTION ENGINE HAVING AN IGNITION APPARATUS, AND MOTOR VEHICLE HAVING AN INTERNAL COMBUSTION ENGINE

(71) Applicant: Bayerische Motoren Werke Aktiengesellschaft, Munich (DE)

(72) Inventors: Reinhard Aschenbrenner, Lengdorf (DE); Manfred Fraenk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/038,346

(22) PCT Filed: Nov. 22, 2021

(86) PCT No.: PCT/EP2021/082425
§ 371 (c)(1),
(2) Date: May 23, 2023

(87) PCT Pub. No.: WO2022/128342
PCT Pub. Date: Jun. 23, 2022

(65) Prior Publication Data
US 2023/0417211 A1 Dec. 28, 2023

(30) Foreign Application Priority Data
Dec. 16, 2020 (DE) ...................... 10 2020 133 717.5

(51) Int. Cl.
*F02P 13/00* (2006.01)
*F02P 3/01* (2006.01)

(52) U.S. Cl.
CPC ................. *F02P 13/00* (2013.01); *F02P 3/01* (2013.01)

(58) Field of Classification Search
CPC .................................. F02P 13/00; F02P 3/01
(Continued)

(56) References Cited

U.S. PATENT DOCUMENTS 1,506,861 A * 9/1924 Palmeri ................... H01T 13/54
313/142
4,076,001 A * 2/1978 Kuno .................. F02B 19/1004
123/271
(Continued)

FOREIGN PATENT DOCUMENTS

AT 522050 A1 8/2020
DE 10 2018 220 177 A1 5/2020

OTHER PUBLICATIONS

International Search Report (PCT/ISA/210) issued in PCT Application No. PCT/EP2021/082425 dated Feb. 14, 2022 with English translation (four (4) pages).
(Continued)

*Primary Examiner* — Sizo B Vilakazi
(74) *Attorney, Agent, or Firm* — Crowell & Moring LLP

(57) ABSTRACT

An ignition apparatus for an internal combustion engine includes at least one pre-chamber and at least one ignition source. The pre-chamber is coupled to the ignition source in the longitudinal extension direction of the ignition apparatus such that it can rotate about a center axis of the ignition apparatus without offset between at least two rotation direction positions of the pre-chamber relative to the ignition source. In at least one decoupling rotation direction position, the pre-chamber is reversibly detachable from the ignition source and can be spaced from the ignition source in the longitudinal extension direction.

15 Claims, 3 Drawing Sheets

(58) Field of Classification Search
USPC .......................... 123/209, 253, 260, 266, 281
See application file for complete search history.

(56) References Cited

U.S. PATENT DOCUMENTS

| | | | | |
|---|---|---|---|---|
| 9,732,664 | B2* | 8/2017 | Trinkel | .................. F02M 57/06 |
| 2007/0236122 | A1* | 10/2007 | Borror | .................... H01T 13/54 |
| | | | | 313/118 |
| 2016/0312685 | A1* | 10/2016 | Furukawa | ............... F02B 43/00 |
| 2021/0156334 | A1* | 5/2021 | Berkemeier | ............ F02F 1/242 |

OTHER PUBLICATIONS

German-language Written Opinion (PCT/ISA/237) issued in PCT Application No. PCT/EP2021/082425 dated Feb. 14, 2022 (six (6) pages).

German-language Search Report issued in German Application No. 10 2020 133 717.5 dated Aug. 23, 2021 with partial English translation (12 pages).

* cited by examiner

IGNITION APPARATUS HAVING A PRE-CHAMBER WHICH IS COUPLED ROTATABLY WITHOUT OFFSET TO AN IGNITION SOURCE, INTERNAL COMBUSTION ENGINE HAVING AN IGNITION APPARATUS, AND MOTOR VEHICLE HAVING AN INTERNAL COMBUSTION ENGINE

FIELD

The invention relates to an ignition apparatus for an internal combustion engine, with at least one pre-chamber and with at least one ignition source. Further aspects of the invention relate to an internal combustion engine with an ignition apparatus of this type, and to a motor vehicle with an internal combustion engine.

BACKGROUND AND SUMMARY

Ignition apparatuses are used to provide an ignition source, for example in the form of an ignition spark, in the case of internal combustion engines which are operated using gasoline engines and therefore spark ignition, and to bring about an ignition of a mixture of fuel and air (also called fuel/air mixture) as a result. Ignition apparatuses which are configured as spark plugs are particularly widespread, but other ignition apparatuses are also known such as, for example, what is known as laser ignition for igniting the mixture.

AT 522050 A1 has disclosed a liquid-cooled internal combustion engine, with a cylinder head which has a coolant space, and with a pre-chamber which is arranged on the cylinder head and is formed by way of at least one pre-chamber component. A fuel feed device which is connected to the pre-chamber component opens into the pre-chamber. The fuel feed device is arranged in a sealing sleeve which is connected fixedly to the pre-chamber component and, at its first end which faces the pre-chamber component, is connected in a liquid-tight manner to the pre-chamber component.

It is an object of the present invention to provide an ignition apparatus of the type mentioned at the outset which can be mounted and oriented with low complexity, and an internal combustion engine with an ignition apparatus of this type, and a motor vehicle with an internal combustion engine.

This object is achieved by way of an ignition apparatus with the features as disclosed herein, by way of an internal combustion engine with the features as disclosed herein, and by way of a motor vehicle with the features as disclosed herein. Advantageous refinements with expedient developments of the invention are also specified herein.

A first aspect of the invention relates to an ignition apparatus for an internal combustion engine, with at least one pre-chamber and with at least one ignition source.

It is provided according to the invention that the at least one pre-chamber is coupled to the at least one ignition source such that it can be rotated without offset in the longitudinal extent direction of the ignition apparatus about a center axis of the ignition apparatus between at least two rotational orientation positions of the pre-chamber relative to the ignition source, and, in at least one decoupling rotational orientation position, can be released reversibly from the at least one ignition source and can be spaced apart from the ignition source in the longitudinal extent direction.

The coupling of the at least one pre-chamber to the at least one ignition source with the simultaneous possibility of rotating the ignition apparatus without offset about a center axis of the ignition apparatus accompanies the advantage that, during the mounting of the ignition apparatus, firstly both the at least one ignition apparatus and the at least one pre-chamber can be fixed jointly and therefore with low complexity, for example on a cylinder head of the internal combustion engine, and secondly a relative rotation of the pre-chamber relative to the ignition source and therefore a low-complexity orientation of the pre-chamber relative to the ignition source is possible in the mounted state or during mounting of the ignition apparatus, without the offset between the pre-chamber and the ignition source in the longitudinal extent direction of the ignition apparatus occurring during this relative rotation. Dismantling, that is to say decoupling, of the pre-chamber from the ignition source can likewise take place with low complexity.

Within the context of the present invention, the term, according to which the pre-chamber can be rotated without offset in the longitudinal extent direction about the center axis of the ignition apparatus between the at least two rotational orientation positions of the pre-chamber relative to the ignition source, is to be understood such that no spacing change between the pre-chamber and the ignition apparatus occurs in the longitudinal extent direction of the ignition apparatus during the rotation of the pre-chamber relative to the ignition apparatus, which applies at least to the relative rotation between the rotational orientation positions. In other words, the at least one pre-chamber and the at least one ignition apparatus are therefore coupled to one another such that they can be rotated relative to one another without a spacing change. As a result, the at least one pre-chamber and the at least one ignition source can be coupled to one another, in particular, without a thread.

Within the context of the invention, the term "rotational orientation position" is to be understood to mean a position of the pre-chamber which the pre-chamber can assume by way of relative rotation between the pre-chamber and the ignition source about the center axis, without an offset between the ignition source and the pre-chamber in the longitudinal extent direction occurring as a result. In particular, the pre-chamber and the ignition source can be coupled to one another reversibly and captively in all rotational orientation positions.

Within the context of the invention, the term "decoupling rotational orientation position" is to be understood to mean a position of the pre-chamber which is different than the rotational orientation positions and which the pre-chamber can assume by way of relative rotation between the pre-chamber and the ignition source about the center axis, the decoupling of the pre-chamber from the ignition source and the offset between the ignition source and the pre-chamber in the longitudinal extent direction being enabled in the decoupling rotational orientation position. A spacing change between the pre-chamber and the ignition source in the longitudinal extent direction can therefore take place in the decoupling rotational orientation position, whereas the spacing change is prevented in the respective rotational orientation positions. In other words, the pre-chamber and the ignition apparatus can be released reversibly from one another and can be offset relative to one another in the longitudinal extent direction in the decoupling rotational orientation position, but are coupled to one another in the respective rotational orientation positions.

The invention is based on the finding that, in the case of apparatuses which are known from the prior art, screw connections between spark plugs and pre-chamber sleeves can be provided, with the result that, in the case of a rotation of the spark plug relative to the pre-chamber sleeve or conversely, the length offset between the spark plug and the pre-chamber sleeve also occurs at the same time, due to a thread pitch of respective threads of the screw connection. This makes positioning of the pre-chamber sleeve relative to the spark plug more difficult. The invention comes into play here, since, as a result of the configuration of the present ignition apparatus, an offset of this type, as is customary in the case of screw connections of this type, can be ruled out even during the relative rotation as long as the pre-chamber is situated in one of the at least two rotational orientation positions.

In one advantageous development of the invention, the ignition apparatus comprises at least one coupling element, via which the at least one pre-chamber and the at least one ignition source are coupled to one another such that they can be rotated about the center axis without offset in the longitudinal extent direction at least in the at least two rotational orientation positions. This is advantageous, since the coupling element can accordingly assume the task of coupling between the pre-chamber and the ignition source, as a result of which both the at least one pre-chamber and the at least one ignition source can each have a simple construction.

In a further advantageous development of the invention, the ignition apparatus comprises a collar which is arranged on the at least one pre-chamber, runs around in regions in the circumferential direction of the at least one ignition apparatus, and on which the at least one ignition source can be supported in the longitudinal extent direction via the coupling element at least in the at least two rotational orientation positions. In an alternative, advantageous development of the invention, the ignition apparatus comprises a collar which is arranged on the at least one ignition source, runs around in regions in the circumferential direction of the at least one ignition apparatus, and on which the at least one pre-chamber can be supported in the longitudinal extent direction via the coupling element at least in the at least two rotational orientation positions. The collar advantageously represents a particularly simple design solution, which enables the coupling element to support itself in the respective rotational orientation positions. The coupling element can simply slide along on the collar during the relative rotation between the different rotational orientation positions, without an offset between the pre-chamber and the ignition source in the longitudinal extent direction or even decoupling of the pre-chamber from the ignition source occurring.

In a further advantageous development of the invention, the collar which runs around in regions is interrupted by way of a recess, through which the coupling element can be guided in the longitudinal extent direction in the at least one decoupling rotational orientation position and, as a result, the at least one ignition source and the at least one pre-chamber can be released from one another reversibly. The recess is a particularly simple structural solution, by way of which the collar can be interrupted in the circumferential direction and, as a result, can run around merely in regions.

In a further advantageous development of the invention, the at least one coupling element is configured as a pin, in particular a cylindrical pin, or as a projection which is produced by way of beading, in particular a lug. This is advantageous, since a pin of this type, in particular a cylindrical pin, or a projection of this type which is produced by way of beading, in particular a lug, enables particularly durable and structurally simple coupling between the at least one ignition source and the at least one pre-chamber.

In a further advantageous development of the invention, the at least one ignition source is configured as a spark plug. This is advantageous, since a particularly reliable ignition, that is to say a reliably reproducible ignition of a fuel/air mixture, can take place by means of the ignition source as a result.

Here, the at least one pre-chamber can preferably be configured at least in regions as a counter-electrode for the at least one ignition source which is configured as a spark plug.

In a further advantageous development of the invention, the at least one ignition source and the at least one pre-chamber form a sealing seat with one another. This is advantageous, since reliable sealing between the pre-chamber and the ignition source is enabled as a result, even without further sealing elements, for example sealing rings. The sealing seat can be gas-tight, that is to say it can prevent an escape of gas from the pre-chamber in the region of the ignition source. The pre-chamber and/or the ignition source can preferably have a conical contact region on the sealing seat, at which conical contact region the pre-chamber and the ignition source can bear against one another with the configuration of the sealing seat. A particularly reliable seal can be produced by way of the conical contact region. The sealing seat can be present at least in the installed position of the ignition apparatus on the internal combustion engine, that is to say on the cylinder head, for example.

A second aspect of the invention relates to an internal combustion engine with at least one ignition apparatus in accordance with the first aspect of the invention. This is advantageous, since low-complexity mounting and low-complexity adjustment of the ignition apparatus are enabled in the case of an internal combustion engine of this type.

A third aspect of the invention relates to a motor vehicle with an internal combustion engine in accordance with the second aspect of the invention, particularly low-complexity mounting and low-complexity adjusting of the ignition apparatus, in particular orientation of the pre-chamber by way of rotation relative to the ignition source, being enabled in the case of the latter.

The preferred embodiments proposed in relation to one of the aspects and their advantages apply mutatis mutandis to the other aspects of the invention, and vice versa.

The features and combinations of features mentioned above in the description and the features and combinations of features mentioned in the description of the figures below and/or shown solely in the figures can be used not only in the respective specified combination, but rather also in other combinations or on their own, without departing from the scope of the invention.

Further advantages, features and details of the invention result from the claims, the following description of preferred embodiments, and on the basis of the drawings.

In the following text, the invention is explained once more on the basis of one specific exemplary embodiment.

DETAILED DESCRIPTION

Figure 1:
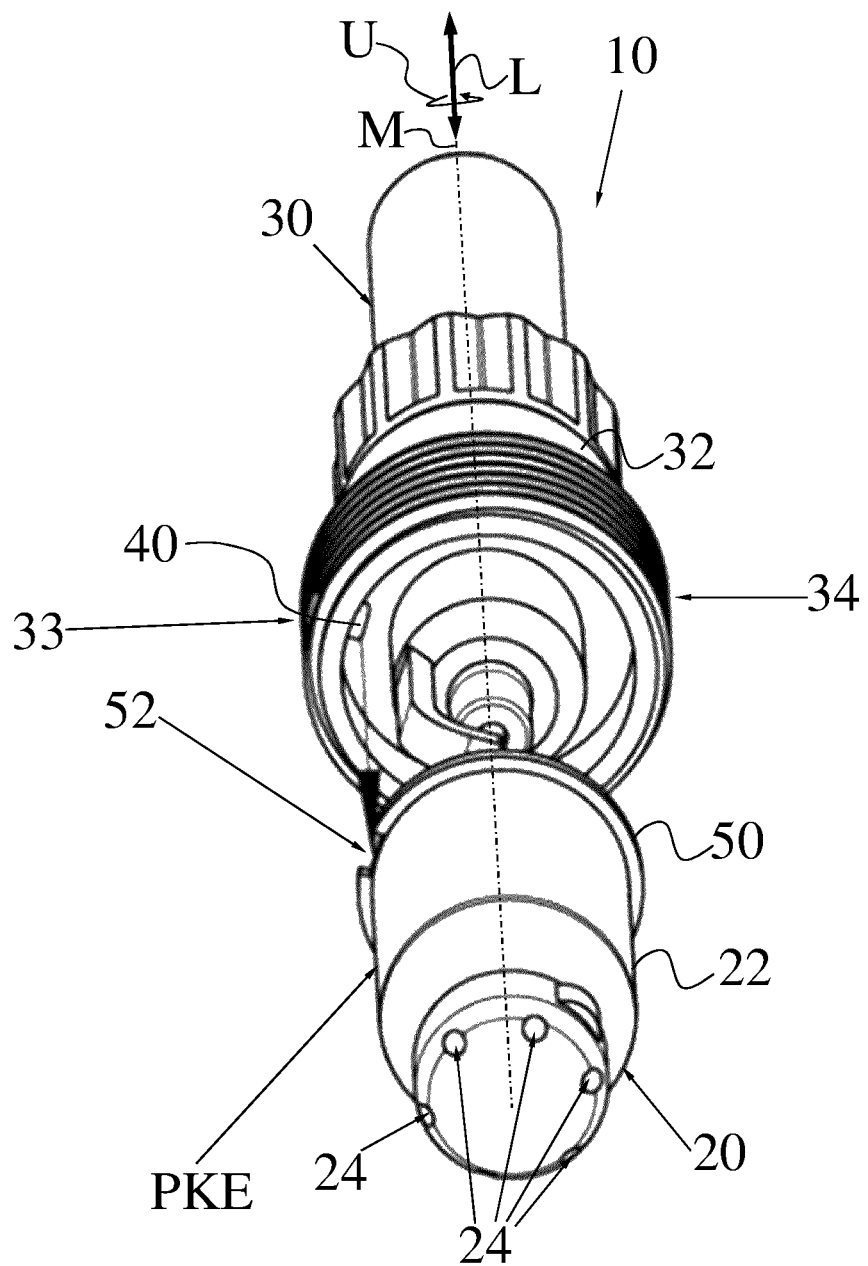
FIG. 1 shows a diagrammatic exploded illustration of an ignition apparatus which comprises an ignition source, configured as a spark plug, and a pre-chamber, and in the case of which the pre-chamber is shown in a decoupling rotational orientation position, in which the pre-chamber can be released reversibly from the ignition source and can be spaced apart from the ignition source in the longitudinal extent direction.

FIG. 1 shows a diagrammatic exploded illustration of an ignition apparatus 10 for an internal combustion engine 100. The ignition apparatus 10 can be arranged on a cylinder head 102 (shown in detail in FIG. 3) of the internal combustion engine 100, and can be fixed in a reversibly releasable manner here. The internal combustion engine 100 serves to drive a motor vehicle K which is shown in a highly abstracted form in FIG. 3. In other words, the motor vehicle K therefore comprises the internal combustion engine 100 and therefore also the ignition apparatus 10.

The ignition apparatus 10 comprises a pre-chamber 20 and an ignition source 30. The ignition source 30 is configured as a spark plug, and comprises a center electrode 36 and in the present case likewise a counter-electrode 38 which is also called a ground electrode, as can be seen on the basis of FIG. 1, FIG. 2 or FIG. 3.

The pre-chamber 20 comprises a pre-chamber wall 22, on which through openings 24 are arranged at one end of the pre-chamber 20 which faces away from the ignition source 30. In an installed position (shown in FIG. 3) of the ignition apparatus 10 on the cylinder head 102, the through openings 24 connect a pre-chamber interior space 26, delimited at least in regions by way of the pre-chamber wall 22, to a combustion chamber 104 of the internal combustion engine 100. During operation of the internal combustion engine 100, a fluid or a fluid mixture, for example in the form of a fuel/air mixture, can enter from the combustion chamber 104 via the through openings 24 into the pre-chamber interior space 26 and can be ignited there using the ignition source 30 which is configured as a spark plug, especially since the center electrode 36 and the counter-electrode 38 are arranged in the pre-chamber interior space 26.

Figure 2:
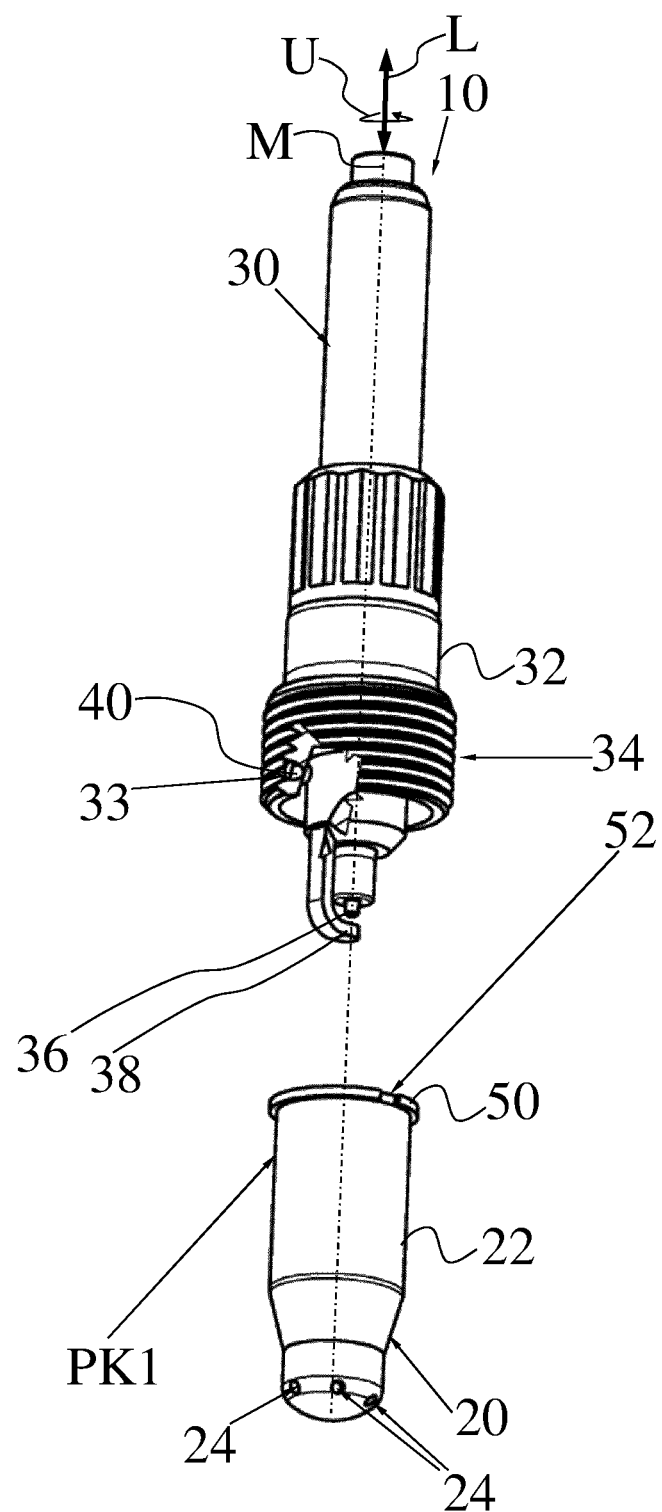
FIG. 2 shows a further diagrammatic exploded illustration of the ignition apparatus, in which the pre-chamber is rotated about a center axis of the ignition apparatus relative to the ignition source in comparison with FIG. 1, as a result of which the pre-chamber is situated in a first rotational orientation position.
Figure 3:
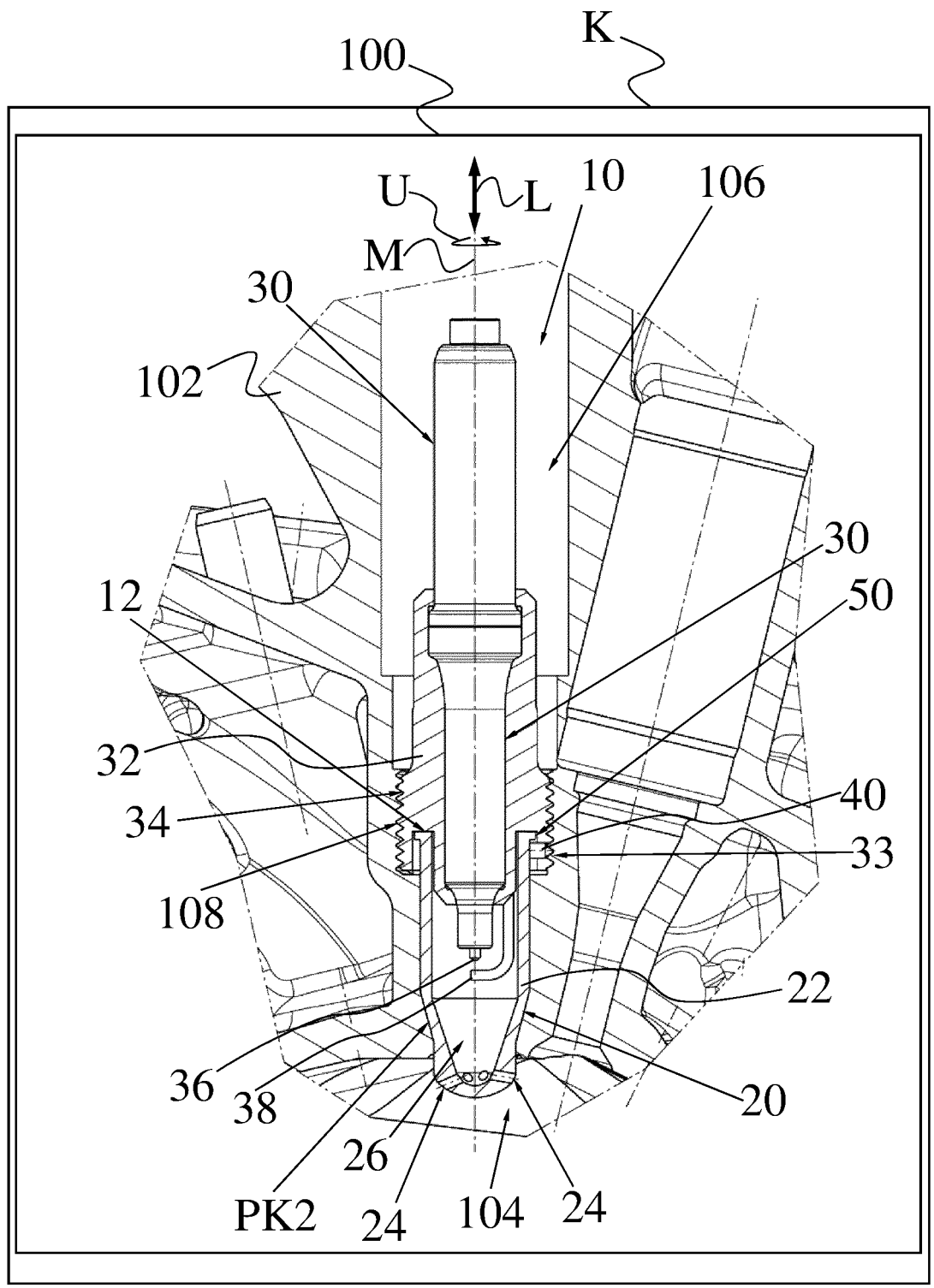
FIG. 3 shows a highly abstractly illustrated motor vehicle and a diagrammatic sectional illustration of a part region of an internal combustion engine which has a cylinder head, on which the ignition apparatus is mounted and in the process the pre-chamber is rotated relative to the ignition source into a second rotational orientation position.

The pre-chamber 20 is coupled to the ignition source 30 such that it can be rotated about a center axis M of the ignition apparatus 10 without offset in the longitudinal extent direction L of the ignition apparatus 10 between a plurality of rotational orientation positions of the pre-chamber 20 relative to the ignition source 30. Merely two rotational orientation positions PK1, PK2 are shown by way of example from this plurality of rotational orientation positions. The first rotational orientation position PK1 is shown in FIG. 2, whereas the second rotational orientation position PK2 is shown in FIG. 3. Each of the rotational orientation positions is distinguished by the fact that, although the rotational orientation positions can be assumed and as a result can be set by way of respective rotational orientation, that is to say rotation of the pre-chamber 20, for example in the form of a relative rotation between the ignition source 30 and the pre-chamber 20, as a result of which an orientation of the through openings 24 relative to the combustion chamber 104 can take place, in particular, during mounting of the ignition apparatus 10 on the internal combustion engine 100, a longitudinal offset, that is to say the offset between the pre-chamber 20 and the ignition source in the longitudinal extent direction L, does not occur during the rotation between the rotational orientation positions.

The ignition apparatus 10 comprises a coupling element 40, via which the pre-chamber 20 and the ignition source 30 are coupled to one another in all the rotational orientation positions and therefore also in the illustrated two rotational orientation positions PK1, PK2 such that they can be rotated about the center axis M without offset in the longitudinal extent direction L. As shown in FIG. 1 to FIG. 3, the coupling element 40 can be configured as a pin, in particular a cylindrical pin. As an alternative to this, the coupling element 40 can be configured as a projection which is produced by way of beading, in particular a lug, which is not shown in the present case. FIG. 2 shows a cutout at the ignition source 30 for improved visibility of the coupling element 40.

The coupling element 40 is introduced in regions into an opening 33 which is arranged on an ignition source wall 32 of the ignition source 30, but protrudes in regions out of the opening 33.

The ignition apparatus 10 comprises a collar 50 which is arranged on the pre-chamber 20, runs around in regions in the circumferential direction U of the ignition apparatus and on which the ignition source 30 can be supported in the longitudinal extent direction L via the coupling element 40 in all the rotational orientation positions and therefore also in the illustrated two rotational orientation positions PK1, PK2. Although not shown in further detail in the present case, it can be provided as an alternative, however, that the ignition apparatus 10 comprises a collar 50 which is arranged on the ignition source 30, runs around in regions in the circumferential direction U of the ignition apparatus 10, and on which the pre-chamber 20 can be supported in the longitudinal extent direction L via the coupling element 40 in all the rotational orientation positions and therefore also in the illustrated two rotational orientation positions PK1, PK2. The coupling element 40 protrudes in regions out of the opening 33, as a result of which the support of the coupling element 40 (of the protruding region of the coupling element 40) on the collar 50 is enabled.

In contrast to FIG. 2 and FIG. 3, FIG. 1 shows the pre-chamber 20 in a decoupling rotational orientation position PKE, in which the pre-chamber 20 can be released reversibly from the ignition source 30 and can be spaced apart from the ignition source 30 in the longitudinal extent direction L. It can be seen here that the collar 50 which runs around in regions is interrupted by way of a recess 52, through which the coupling element 40 can be guided in the longitudinal extent direction L in the decoupling rotational orientation position PKE and, as a result, the ignition source 30 and the pre-chamber 20 can be released reversibly from one another. It can be seen on the basis of FIG. 1 that the recess 52 and the coupling element 40 are aligned in the longitudinal extent direction L which is illustrated by way of a double arrow. Starting from the decoupling rotational orientation position PKE which is shown in FIG. 1, the ignition source 30 and the pre-chamber 20 can be moved toward one another in the longitudinal extent direction L, and the coupling element 40 can be guided through the recess 52 in the process. Following the coupling element 40 being guided through the recess 52, the relative rotation between the pre-chamber 20 and the ignition source 30 about the center axis M can take place until the recess 52 and the coupling element 40 are no longer aligned in the longitudinal extent direction L, but rather instead the coupling element can be supported on the collar 50 and therefore the pre-chamber 20 is coupled captively to the ignition source 30. This is the case in all the rotational orientation positions and therefore also in the illustrated two rotational orientation positions PK1, PK2. The dismantling of the ignition apparatus 10, that is to say the reversible release of the pre-chamber 20 from the ignition source 30, can likewise take place in a particularly low-complexity manner in the reverse order, by the relative rotation of the pre-chamber 20 taking place from one of the rotational orientation positions into the decoupling rotational orientation position PKE, in which the pre-chamber 20 and the ignition source 30 can be spaced apart from one another.

Furthermore, it can be seen on the basis of FIG. 1 to FIG. 3 that the ignition source wall 32 comprises a threaded region 34, on which an external thread is arranged. The threaded region 34 and therefore the external thread serve for reversibly releasable fixing of the ignition apparatus 10 on the cylinder head 102. The ignition apparatus 10 can therefore be screwed to the cylinder head 102 via the threaded region 34 and, as a result, can be connected to the cylinder head 102 in a reversibly releasable manner.

Here, the threaded region 34 has a greater diameter (measured perpendicularly with respect to the center axis M) than regions of the ignition source 30 different than the threaded region 34.

The coupling element 40 can be arranged in the longitudinal extent direction L at the level of the threaded region 34 in a particularly space-saving manner, as can be seen on the basis of FIG. 2 or FIG. 3. Here, the great diameter of the threaded region 34 can be used to couple the pre-chamber 20 via the coupling element 40 to the ignition source 30 radially within the threaded region 34, that is to say in other words between the threaded region 34 and the center axis M.

After coupling of the pre-chamber 20 to the ignition source 30 has taken place, the pre-chamber can be situated in the rotational orientation position PK1 (see FIG. 2), and the entire ignition apparatus 10 can be introduced into a receiving opening 106 (shown in FIG. 3) on the cylinder head 102. When considering FIG. 2, it is to be noted that this, just like FIG. 1, is an exploded illustration of the ignition apparatus 10, in which the pre-chamber 20 and the ignition source 30 are inherently shown separated and spaced apart from one another. The actual illustration of the coupling of the pre-chamber 20 to the ignition source 30 can be seen exclusively in FIG. 3 which shows the ignition apparatus 10 in its installed position.

In addition, the ignition source 30 and the pre-chamber 20 can form a sealing seat 12 with one another at least in the installed position, in order to seal the pre-chamber interior space 26 at least in regions. The sealing seat 12 can be of gas-tight configuration and can prevent any escape of gases, in particular exhaust gases, which prevail under high pressure in the combustion chamber 104 out of the pre-chamber interior space 26 and away from the combustion chamber 104 in the longitudinal extent direction L, even during combustion operation of the internal combustion engine 100.

In order to mount the ignition apparatus 10, this can be screwed in the arrangement in the receiving opening 106 on the cylinder head 102 via the threaded region 34 to an internal thread 108, arranged on the receiving opening 106, of the cylinder head 102. As a result, the pre-chamber 20 is pressed onto the cylinder head 102 in the direction of the combustion chamber 104. At least temporally before the pre-chamber 20 is pressed with the cylinder head 102, that is to say, for example, temporally between a start of the screwing operation of the threaded region 34 to the internal thread 108 and an end of this screwing operation, the pre-chamber 20 and the ignition source 30 can be rotated, on account of their coupling via the coupling element 40, relative to one another between the rotational orientation positions PK1, PK2 and relative to the ignition source 30 about the center axis M, as a result of which a directed installation of the pre-chamber 20 is enabled. As a result, the through openings 24 can also be oriented, for example, relative to an injector (not shown in further detail in the present case) of the internal combustion engine 100 which can be configured for the direct injection of fuel into the combustion chamber 104. In the case of any dismantling of the ignition apparatus 10 from the cylinder head 102, that is to say during release of the ignition apparatus 10 from the cylinder head 102, the coupling of the coupling element 40 (here: pin) to the collar 50 which can be configured generally as a shoulder on the pre-chamber 20 ensures that the pre-chamber 20 can be released together with that the ignition source 30 from the cylinder head 102 during screwing out of the ignition apparatus 10, that is to say during disconnecting of the screw connection of the threaded region 34 to the internal thread 108, as long as the pre-chamber 20 is situated in one of the rotational orientation positions.

Via the coupling element 40 and the collar 50, at least tensile forces can be transmitted between the pre-chamber 20 and the ignition source 30. If the ignition apparatus 10 is therefore released from the cylinder head 102, the pre-chamber 20 can be pulled together with the ignition source 30 out of the receiving opening 106 on the cylinder head 102. By way of support of the coupling element 40 on the collar 50 in one of the rotational orientation positions, tensile forces can be transmitted from the ignition source 30 to the pre-chamber 20 and, as a consequence, the pre-chamber 20 can be pulled together with the ignition source 30 out of the receiving opening 106.

LIST OF DESIGNATIONS

10 Ignition apparatus
12 Sealing seat
20 Pre-chamber
22 Pre-chamber wall
24 Through openings
26 Pre-chamber interior space
30 Ignition source
32 Ignition source wall
33 Opening
34 Threaded region
36 Center electrode
38 Counter-electrode
40 Coupling element
50 Collar
52 Recess
100 Internal combustion engine
102 Cylinder head
104 Combustion chamber
106 Receiving opening
108 Internal thread
K Motor vehicle
L Longitudinal extent direction
M Center axis
PK1 First rotational orientation position PK2 Second rotational orientation position
PKE Decoupling rotational orientation position
U Circumferential direction

The invention claimed is:

1. An ignition apparatus for an internal combustion engine, comprising:
   at least one pre-chamber; and
   at least one ignition source,
   wherein the at least one pre-chamber is configured to be coupled to the at least one ignition source such that it can be rotated without offset in a longitudinal extent direction of the ignition apparatus about a center axis of the ignition apparatus between at least two rotational orientation positions of the pre-chamber relative to the ignition source, and
   wherein the at least one pre-chamber is configured to be released reversibly from the at least one ignition source when rotated to at least one decoupling rotational orientation position relative to the ignition source, and to be spaced apart from the ignition source in the longitudinal extent direction.

2. The ignition apparatus according to claim 1,
   wherein the ignition apparatus comprises at least one coupling element via which the at least one pre-chamber and the at least one ignition source are coupled to one another such that they can be rotated about the center axis without offset in the longitudinal extent direction at least in the at least two rotational orientation positions.

3. The ignition apparatus according to claim 2,
   wherein the ignition apparatus comprises a collar arranged on the at least one pre-chamber that runs around in regions in a circumferential direction of the at least one ignition apparatus, and on which the at least one ignition source is configured to be supported in the longitudinal extent direction via the coupling element at least in the at least two rotational orientation positions.

4. The ignition apparatus according to claim 3,
   wherein the collar comprises a recess that interrupts the collar, and through which the coupling element is configured to be guided in the longitudinal extent direction in the at least one decoupling rotational orientation position such that the at least one ignition source and the at least one pre-chamber are configured to be released from one another reversibly.

5. The ignition apparatus according to claim 2,
   wherein the ignition apparatus comprises a collar arranged on the at least one ignition source that runs around in regions in a circumferential direction of the at least one ignition apparatus, and on which the at least one pre-chamber is configured to be supported in the longitudinal extent direction via the coupling element at least in the at least two rotational orientation positions.

6. The ignition apparatus according to claim 5,
   wherein the collar comprises a recess that interrupts the collar, and through which the coupling element is configured to be guided in the longitudinal extent direction in the at least one decoupling rotational orientation position such that the at least one ignition source and the at least one pre-chamber are configured to be released from one another reversibly.

7. The ignition apparatus according to claim 2,
   wherein the at least one coupling element is configured as a pin.

8. The ignition apparatus according to claim 7,
   wherein the pin is a cylindrical pin.

9. The ignition apparatus according to claim 2,
   wherein the at least one coupling element is configured as a projection produced by way of beading.

10. The ignition apparatus according to claim 9,
    wherein the projection is a lug.

11. The ignition apparatus according to claim 9,
    wherein the projection is produced by way of beading.

12. The ignition apparatus according to claim 1,
    wherein the at least one ignition source is configured as a spark plug.

13. The ignition apparatus according to claim 1,
    wherein the at least one ignition source and the at least one pre-chamber form a sealing seat with one another.

14. An internal combustion engine comprising:
    the ignition apparatus according to claim 1.

15. A motor vehicle comprising:
    the internal combustion engine according to claim 14.

* * * * *